(12) United States Patent
Iyengar et al.

(10) Patent No.: US 8,539,081 B2
(45) Date of Patent: Sep. 17, 2013

(54) ENABLING PROXY SERVICES USING REFERRAL MECHANISMS

(75) Inventors: Anand Iyengar, Moutain View, CA (US); Thomas K. Wong, Pleasanton, CA (US); Panagiotis Tsirigotis, Sunnyvale, CA (US); Rajeev Chawla, Union City, CA (US); Zuwei Liu, Cupertino, CA (US); Matthew Seitz, San Jose, CA (US); Richard A. Simpkins, Mountain View, CA (US)

(73) Assignee: Neopath Networks, Inc., Santa Clara, CA (US)

( * ) Notice: Subject to any disclaimer, the term of this patent is extended or adjusted under 35 U.S.C. 154(b) by 1783 days.

(21) Appl. No.: 10/942,762

(22) Filed: Sep. 15, 2004

(65) Prior Publication Data

US 2005/0125503 A1 Jun. 9, 2005

Related U.S. Application Data

(60) Provisional application No. 60/503,190, filed on Sep. 15, 2003.

(51) Int. Cl.
G06F 15/16 (2006.01)

(52) U.S. Cl.
USPC .......................... 709/227; 709/203; 709/225

(58) Field of Classification Search
USPC .................................. 709/226, 227, 229, 225
See application file for complete search history.

(56) References Cited

U.S. PATENT DOCUMENTS

| | | | |
|---|---|---|---|
| 5,465,335 A | 11/1995 | Anderson | |
| 5,689,701 A | 11/1997 | Ault et al. | |
| 5,774,715 A | 6/1998 | Madany et al. | |
| 5,832,261 A | 11/1998 | Ishizaka et al. | |
| 5,890,169 A | 3/1999 | Wong et al. | |
| 5,933,825 A | 8/1999 | McClaughry et al. | |

(Continued)

FOREIGN PATENT DOCUMENTS

| EP | 0 108 338 A2 | 5/1984 |
|---|---|---|
| EP | 0 926 585 | 6/1999 |

(Continued)

OTHER PUBLICATIONS

Anderson, D.C. et al., "Interposed Request Routing for Scalable Network Storage," ACM Transactions on Computer Systems, Feb. 2002, vol. 20, No. 1, pp. 1-24.

(Continued)

*Primary Examiner* — Dhairya A Patel
(74) *Attorney, Agent, or Firm* — Weaver Austin Villeneuve & Sampson LLP (57) ABSTRACT

A NAS (Network Attaches Storage) switch authenticates a client on multiple file servers for proxy services. The NAS switch enables proxy services by successively authenticating the client on the file servers using referrals. The NAS switch further comprises a connection manager to establish connections to the client and the file servers, a referral manager to redirect the client for successive authentications, and a transaction manager to perform data transfers with the file servers on behalf of the client. The system components support DFS (Distributed File System), and communicate using a protocol dialect that supports referral mechanisms such as NFSv4 (Network File Server version 4) or CIFS (Common Internet File System). The transaction manager also performs a protocol dialect translation service when the connection manager negotiates one protocol dialect with the client, and a different protocol dialect with the file server.

45 Claims, 8 Drawing Sheets

(56) References Cited

U.S. PATENT DOCUMENTS

| | | | |
|---|---|---|---|
| 5,951,656 A | 9/1999 | Finnell | |
| 6,070,254 A | 5/2000 | Pratt et al. | |
| 6,101,508 A | 8/2000 | Wolff | |
| 6,192,408 B1* | 2/2001 | Vahalia et al. | 709/229 |
| 6,314,460 B1 | 11/2001 | Knight et al. | |
| 6,341,302 B1 | 1/2002 | Celis | |
| 6,353,837 B1 | 3/2002 | Blumenau | |
| 6,389,427 B1 | 5/2002 | Faulkner | |
| 6,408,298 B1 | 6/2002 | Van et al. | |
| 6,442,548 B1 | 8/2002 | Balabine et al. | |
| 6,453,354 B1* | 9/2002 | Jiang et al. | 709/229 |
| 6,473,401 B1* | 10/2002 | Kong et al. | 370/229 |
| 6,606,690 B2 | 8/2003 | Padovano | |
| 6,615,365 B1 | 9/2003 | Jenevein et al. | |
| 6,633,887 B2 | 10/2003 | Suzuki et al. | |
| 6,694,431 B1* | 2/2004 | Binding et al. | 713/160 |
| 6,697,846 B1 | 2/2004 | Soltis | |
| 6,711,625 B1 | 3/2004 | Simpson | |
| 6,738,883 B2 | 5/2004 | March et al. | |
| 6,931,410 B2* | 8/2005 | Anderson et al. | 1/1 |
| 6,938,039 B1 | 8/2005 | Bober et al. | |
| 6,983,379 B1 | 1/2006 | Spalink et al. | |
| 6,985,956 B2 | 1/2006 | Luke et al. | |
| 6,996,714 B1 | 2/2006 | Halasz et al. | |
| 7,054,927 B2 | 5/2006 | Ulrich et al. | |
| 7,072,917 B2 | 7/2006 | Wong et al. | |
| 7,089,293 B2 | 8/2006 | Grosner et al. | |
| 7,092,976 B2 | 8/2006 | Curran et al. | |
| 7,096,253 B2 | 8/2006 | Vinson et al. | |
| 7,103,628 B2 | 9/2006 | Neiman et al. | |
| 7,120,666 B2 | 10/2006 | McCanne et al. | |
| 7,127,477 B2 | 10/2006 | Duncombe et al. | |
| 7,237,027 B1 | 6/2007 | Raccah et al. | |
| 7,254,636 B1 | 8/2007 | O'Toole et al. | |
| 7,272,613 B2 | 9/2007 | Sim et al. | |
| 7,272,654 B1 | 9/2007 | Brendel | |
| 7,308,473 B1 | 12/2007 | Thomas et al. | |
| 7,308,709 B1* | 12/2007 | Brezak et al. | 726/10 |
| 7,313,579 B2 | 12/2007 | Murotani | |
| 7,324,995 B2 | 1/2008 | Findleton et al. | |
| 7,346,664 B2 | 3/2008 | Wong et al. | |
| 7,386,610 B1 | 6/2008 | Vekiarides | |
| 7,441,011 B2 | 10/2008 | Lin et al. | |
| 7,475,142 B2* | 1/2009 | Sharma et al. | 709/226 |
| 7,512,673 B2 | 3/2009 | Miloushev et al. | |
| 7,562,110 B2 | 7/2009 | Miloushev et al. | |
| 7,587,422 B2 | 9/2009 | Wong et al. | |
| 7,587,471 B2 | 9/2009 | Yasuda et al. | |
| 7,720,796 B2 | 5/2010 | Wong et al. | |
| 7,831,641 B2 | 11/2010 | Wong et al. | |
| 7,844,646 B1 | 11/2010 | Deshmukh et al. | |
| 8,131,689 B2 | 3/2012 | Tsirigotis et al. | |
| 8,180,843 B2 | 5/2012 | Wong et al. | |
| 8,190,741 B2 | 5/2012 | Wong et al. | |
| 8,195,627 B2 | 6/2012 | Wong et al. | |
| 2002/0013832 A1 | 1/2002 | Hubbard | |
| 2002/0111929 A1 | 8/2002 | Pudipeddi et al. | |
| 2002/0120763 A1 | 8/2002 | Miloushev et al. | |
| 2002/0133491 A1 | 9/2002 | Sim et al. | |
| 2002/0154645 A1 | 10/2002 | Hu et al. | |
| 2002/0161855 A1 | 10/2002 | Manczak et al. | |
| 2002/0184244 A1 | 12/2002 | Hsiao et al. | |
| 2002/0199060 A1 | 12/2002 | Peters et al. | |
| 2003/0037061 A1 | 2/2003 | Sastri et al. | |
| 2003/0046270 A1 | 3/2003 | Leung et al. | |
| 2003/0046335 A1* | 3/2003 | Doyle et al. | 709/203 |
| 2003/0056112 A1 | 3/2003 | Vinson et al. | |
| 2003/0110263 A1 | 6/2003 | Shillo | |
| 2003/0120948 A1 | 6/2003 | Schmidt et al. | |
| 2003/0126247 A1 | 7/2003 | Strasser et al. | |
| 2003/0140051 A1 | 7/2003 | Fujiwara et al. | |
| 2003/0154236 A1 | 8/2003 | Dar et al. | |
| 2003/0177178 A1 | 9/2003 | Jones et al. | |
| 2003/0182313 A1 | 9/2003 | Federwisch et al. | |
| 2003/0195903 A1 | 10/2003 | Manley et al. | |
| 2003/0204613 A1 | 10/2003 | Hudson et al. | |
| 2003/0204670 A1 | 10/2003 | Holt et al. | |
| 2003/0220899 A1 | 11/2003 | Numanoi et al. | |
| 2003/0220985 A1 | 11/2003 | Kawamoto et al. | |
| 2004/0010714 A1 | 1/2004 | Stewart | |
| 2004/0024963 A1 | 2/2004 | Talagala et al. | |
| 2004/0054748 A1 | 3/2004 | Ackaouy et al. | |
| 2004/0078465 A1 | 4/2004 | Coates et al. | |
| 2004/0088297 A1 | 5/2004 | Coates et al. | |
| 2004/0103104 A1 | 5/2004 | Hara et al. | |
| 2004/0117438 A1 | 6/2004 | Considine et al. | |
| 2004/0133577 A1 | 7/2004 | Miloushev et al. | |
| 2004/0133606 A1 | 7/2004 | Miloushev et al. | |
| 2004/0133650 A1 | 7/2004 | Miloushev et al. | |
| 2004/0133652 A1 | 7/2004 | Miloushev et al. | |
| 2004/0139167 A1 | 7/2004 | Edsall et al. | |
| 2004/0153481 A1 | 8/2004 | Talluri | |
| 2004/0186849 A1 | 9/2004 | Enko et al. | |
| 2004/0267752 A1 | 12/2004 | Wong et al. | |
| 2004/0267831 A1 | 12/2004 | Wong et al. | |
| 2005/0033932 A1 | 2/2005 | Pudipeddi et al. | |
| 2005/0055402 A1 | 3/2005 | Sato | |
| 2005/0080981 A1 | 4/2005 | Archambault et al. | |
| 2005/0188211 A1 | 8/2005 | Scott et al. | |
| 2005/0198062 A1 | 9/2005 | Shapiro | |
| 2005/0262102 A1* | 11/2005 | Anderson et al. | 707/10 |
| 2006/0080371 A1 | 4/2006 | Wong et al. | |
| 2006/0129627 A1* | 6/2006 | Phillips et al. | 709/200 |
| 2006/0161746 A1 | 7/2006 | Wong et al. | |
| 2006/0253501 A1 | 11/2006 | Langan et al. | |
| 2006/0271598 A1* | 11/2006 | Wong et al. | 707/200 |
| 2007/0024919 A1 | 2/2007 | Wong et al. | |
| 2007/0074207 A1 | 3/2007 | Bates et al. | |
| 2007/0136308 A1 | 6/2007 | Tsirigotis et al. | |
| 2008/0114854 A1 | 5/2008 | Wong et al. | |

FOREIGN PATENT DOCUMENTS

| | | |
|---|---|---|
| EP | 1 209 556 | 5/2002 |
| EP | 1 311 122 A2 | 5/2003 |
| EP | 1 396 789 A2 | 3/2004 |
| JP | HEI 4-113432 (A) | 4/1992 |
| JP | HEI 04-299747 | 10/1992 |
| JP | HEI 10-247155 | 9/1998 |
| JP | 2001-075843 | 3/2001 |
| JP | 2004-054607 | 2/2004 |
| JP | 2004-110290 | 4/2004 |
| JP | 2005/502096 | 1/2005 |
| WO | WO2004/053677 | 6/2004 |
| WO | 2004/097571 | 11/2004 |
| WO | 2004/097572 | 11/2004 |
| WO | 2004/097624 | 11/2004 |
| WO | 2004/097686 | 11/2004 |
| WO | 2005/029251 | 3/2005 |
| WO | 2006/039689 | 4/2006 |
| WO | WO2006/080371 | 8/2006 |
| WO | 2007/002855 | 1/2007 |
| WO | 2007/041456 | 4/2007 |

OTHER PUBLICATIONS

Bright, J.D. et al., "A Scalable Architecture for Clustered Network Attached Storage," Twentieth IEEE/Eleventh NASA Goddard Conference on Mass Storage Systems & Technologies, Apr. 7-10, 2003, 12 pages, Paradise Point Resort, San Diego, CA, USA.

Goldick, J., "Retry of Extending Networking Design Notes," PSC, Carnegie-Mellon University, Feb. 1995, 42 pages.

"Leveraging the Benefits of the EMC CLARiiON IP4700 Network File Server With the Oracle8i Database," an Engineering White Paper, Mar. 5, 2002, EMC Corporation.

"Notification of Transmittal of the International Search Report and The Written Opinion of The International Searching Authority, or The Declaration," for PCT/US04/12844, Mar. 14, 2005, 14 pages.

Notification of Transmittal of the International Search Report and the Written Opinion, PCT/US04/12841, Oct. 13, 2004, 9 pages.

Notification of Transmittal of the International Search Report and Written Opinion, PCT/US04/12846, Sep. 28, 2004, 8 pages.

Notification of Transmittal of the International Search Report and Written Opinion, PCT/US04/12847, Nov. 3, 2004, 7 pages.

Notification of International Search Report and Written Opinion, PCT/US04/30180, Mar. 27, 2006, 8 pages.
Office Action mailed Jan. 3, 2007 for U.S. Appl. No. 10/832,785.
Final Office Action mailed Aug. 31, 2007 for U.S. Appl. No. 10/832,785.
Office Action mailed Dec. 18, 2006 for U.S. Appl. No. 10/831,701.
International Search Report mailed May 8, 2007 for PCT Application No. US/2006/25430.
Written Opinion mailed May 8, 2007 for PCT Application No. US/2006/25430.
Final Office Action mailed Sep. 12, 2007, for U.S. Appl. No. 10/831,701.
Office Action mailed Jan. 11, 2008, for U.S. Appl. No. 11/324,845.
Office Action mailed Mar. 23, 2007, for U.S. Appl. No. 10/831,376.
Final Office Action mailed Aug. 10, 2007, for U.S. Appl. No. 10/831,376.
Office Action, U.S. Appl. No. 11/241,554, mailed Aug. 8, 2007.
Notice of Allowance mailed Oct. 22, 2007, for U.S. Appl. No. 10/831,376.
Allowed Claims, U.S. Appl. No. 10/831,376, dated Oct. 22, 2007.
Office Action, U.S. Appl. No. 10/832,785, mailed May 28, 2008.
Office Action, U.S. Appl. No. 10/831,701, mailed Jun. 25, 2008.
Final Office Action, U.S. Appl. No. 11/324,845, mailed Sep. 5, 2008, 2008.
Final Office Action, U.S. Appl. No. 11/241,554, mailed Jul. 25, 2008.
International Search Report sent Sep. 30, 2008 for PCT Application No. PCT/US05/35624.
Written Opinion sent Sep. 30, 2008 for PCT Application No. PCT/US05/35624.
U.S. Appl. No. 60/478,154, filed Apr. 24, 2003.
U.S. Appl. No. 60/465,578, filed Apr. 24, 2003.
U.S. Appl. No. 60/465,579, filed Apr. 24, 2003.
U.S. Appl. No. 60/615,002, filed Sep. 30, 2004.
U.S. Appl. No. 60/641,217, filed Dec. 31, 2004.
Office Action mailed Feb. 3, 2005 for U.S. Appl. No. 10/832,927.
Office Action mailed Jun. 22, 2005 for U.S. Appl. No. 10/832,927.
Notice of Allowance mailed Feb. 9, 2006 for U.S. Appl. No. 10/832,927.
Allowed Claims, U.S. Appl. No. 10/832,927, dated Feb. 9, 2006.
U.S. Appl. No. 60/465,580, filed Apr. 24, 2003.
Final Office Action mailed Jan. 5, 2009 for U.S. Appl. No. 10/832,785.
Final Office Action, U.S. Appl. No. 10/831,701, mailed Jan. 5, 2009.
Office Action mailed Feb. 9, 2009, for U.S. Appl. No. 11/324,845.
European Search Report dated Dec. 4, 2008 for EP Patent Application No. 04750678.7.
Office Action, U.S. Appl. No. 11/241,554, mailed Jan. 8, 2009.
International Preliminary Report on Patentability dated Apr. 10, 2008 for PCT Application No. PCT/US2006/038361.
Allowed Claims for U.S. Appl. No. 10/831,701.
Final Office Action issued for U.S. Appl. No. 11/241,554, mailed Aug. 19, 2009.
Examiner U.S. Appl. No. 11/241,554, mailed Sep. 30, 2009.
Office Action issued for U.S. Appl. No. 11/395,118, mailed Jun. 10, 2009.
Office Action issued for U.S. Appl. No. 11/537,997, mailed Sep. 25, 2009.
European Office Action issued for EP Patent Application No. 04750678.7, dated Apr. 9, 2009.
Notice of Allowance mailed Mar. 16, 2010, for U.S. Appl. No. 11/324,845.
Japanese Office Action dated Dec. 22, 2009 for JP Patent Application No. 2006-513342.
Yamakawa et al., "NAS Switch: Virtualized Integration Techniques of NFS Server", Engineering Research Report of Institute of Electronics, Information and Communication Engineers published by Institute of Electronics, Information and Communication Engineers, Japan, Aug. 12, 2002, vol. 102, No. 275, pp. 13-18. Japan.
Notice of Allowance with Examiner Interview and Amendment dated Dec. 29, 2009 for U.S. Appl. No. 10/832,785.
U.S. Appl. No. 60/503,190, filed Sep. 15, 2003, Wong et al.
Notice of Allowance with Examiner Interview and Amendment dated Apr. 21, 2010 for U.S. Appl. No. 10/832,785.
Notice of Allowance mailed Dec. 2, 2009, for U.S. Appl. No. 11/324,845.
Office Action, U.S. Appl. No. 11/241,554, mailed Feb. 5, 2010.
Final Office Action, U.S. Appl. No. 11/395,118, mailed Feb. 18, 2010.
Office Action U.S. Appl. No. 11/537,997, dated Apr. 15, 2010.
International Preliminary Report on Patentability dated Mar. 5, 2009, PCT Application No. PCT/US2005/035624.
European Office Action dated Apr. 9, 2009 for EP Patent Application No. 04750678.7.
European Office Action dated Feb. 22, 2010 for EP Patent Application No. 04750678.7.
US Notice of Allowance dated Jul. 6, 2011 issued in U.S. Appl. No. 11/241,554.
US Office Action dated Mar. 11, 2011 issued in U.S. Appl. No. 11/395,118.
US Office Action dated Mar. 31, 2011 issued in U.S. Appl. No. 11/537,997.
US Final Office Action dated Feb. 25, 2011 issued in U.S. Appl. No. 12/019,582.
US Notice of Allowance dated Jun. 15, 2011 issued in U.S. Appl. No. 12/019,582.
US Office Action dated Jan. 20, 2011 issued in U.S. Appl. No. 11/478,998.
US Office Action dated Jul. 8, 2011 issued in U.S. Appl. No. 11/478,998.
European Examination Report dated Nov. 9, 2010 issued in 04 750 678.7-1245.
PCT International Preliminary Report on Patentability and Written Opinion dated Jan. 9, 2008 issued in PCT/US2006/25430.
European Extended Search Report, Supplementary Search Report and Search Opinion dated Feb. 25, 2011 issued in EP 06 785 872.0.
Cams et al., (Oct. 1, 2000) "PVFS: A Parallel File System for Linux Clusters", *Proceedings of the 4th Annual Linux Showcase and Conference*, vol. 4, pp. 317-327, XP002532238, USENIX ASSOC, Atlanta, Georgia.
Sheth et al., (Dec. 17, 1998) "Data structure distribution and multi-threading of Linux file system for multiprocessors", 5th International Conference on High Performance Computing, 1998 (HIPC '98); Madras, India Dec. 17-20, 1998, IEEE Comput. Soc, US, pp. 97-104, XP010317644, DOI: DOI:10.1109/HIPC.1998.737976.
US Notice of Allowance dated Oct. 28, 2011 issued in U.S. Appl. No. 11/241,554.
US Notice of Allowance dated Oct. 19, 2011 issued in U.S. Appl. No. 11/395,118.
US Notice of Allowance dated Sep. 30, 2011 issued in U.S. Appl. No. 12/019,582.
European Summons to attend oral proceedings dated Oct. 6, 2011 issued in EP Patent Application No. 04 750 678.7-1245.
European Extended Search Report, supplementary European Search Report, and European Search Opinion dated Jul. 26, 2011 issued in EP 05 802 942.2.
Japanese Office Action (Notice of Grounds for Rejection) dated May 10, 2011 issued in JP 2007-534880.
Katsurashima et al. (2003) "Design and Evaluation of CIFS Server Virtualization Method", *Technical Research Report (IEIC), The Institute of Electronics Information and Communication Engineers*, 103(248): 73-78.
US Office Action Final dated Jul. 29, 2011 issued in U.S. Appl. No. 11/395,118.
US Notice of Allowance dated Aug. 5, 2011 issued in U.S. Appl. No. 11/537,997.
US Advisory Action dated Nov. 21, 2007 issued in U.S. Appl. No. 10/832,785.
US Notice of Allowance and Examiner-Initiated Interview Summary dated Aug. 9, 2010 issued in U.S. Appl. No. 10/832,785.
US Advisory Action dated Nov. 27, 2007 issued in U.S. Appl. No. 10/831,701.
US Advisory Action dated Nov. 21, 2008 issued in U.S. Appl. No. 11/324,845.
US Examiner Interview Summary Application dated Mar. 31, 2009 issued in U.S. Appl. No. 11/241,554.

US Office Action Final dated Jul. 21, 2010 issued in U.S. Appl. No. 11/241,554.
US Examiner Interview Summary dated Sep. 14, 2010 issued in U.S. Appl. No. 11/241,554.
US Office Action (Examiner Interview Summary) dated Jul. 19, 2010 issued in U.S. Appl. No. 11/537,997.
US Office Action dated Sep. 22, 2010 issued in U.S. Appl. No. 12/019,582.
U.S. Appl. No. 60/667,567, filed Mar. 31, 2005, Wong et al.
U.S. Appl. No. 60/722,465, filed Sep. 30, 2005, Tsirigotis et al.
PCT International Search Report dated Aug. 29, 2007 issued in PCT/US2006/038361.
PCT International Preliminary Report on Patentability and Written Opinion dated Aug. 29, 2007 issued in PCT/US2006/038361.
Chinese First Office Action dated Nov. 20, 2009 issued in CN Patent Application No. 200680032142.X.
European Supplementary Search Report dated Jun. 4, 2010 issued in EP 06 81 5981.
US Allowed Claims, U.S. Appl. No. 11/241,554, dated Oct. 28, 2011.
US Notice of Allowance dated Feb. 3, 2012 issued in U.S. Appl. No. 11/241,554.
US Allowed Claims, U.S. Appl. No. 11/395,118, dated Oct. 19, 2011.
US Notice of Allowance dated Feb. 3, 2012 issued in U.S. Appl. No. 11/395,118.
US Notice of Allowance dated Nov. 28, 2011 issued in U.S. Appl. No. 11/537,997.
US Allowed Claims, U.S. Appl. No. 12/019,582, dated Jun. 15, 2011.
US Notice of Allowance dated Jan. 13, 2012 issued in U.S. Appl. No. 12/019,582.
US Office Action Final dated Dec. 22, 2011 issued in U.S. Appl. No. 11/478,998.
European Result of Consultation dated Feb. 21, 2012 issued in EP Patent Application No. 04 750 678.7-1245.
European Decision to Refuse an application and Minutes of Oral Proceedings dated Feb. 23, 2012 issued in EP Patent Application No. 04 750 678.7-1245.
Japanese Decision of Rejection (Final Rejection) dated Jun. 5, 2012 issued in JP 2007-534880.
Office Action issued for U.S. Appl. No. 10/832,785, mailed Jun. 8, 2009.
Final Office Action issued for U.S. Appl. No. 10/831,701, mailed Jan. 5, 2009.
Notice of Allowance issued for U.S. Appl. No. 10/831,701, mailed May 14, 2009.
Notice of Allowance issued for U.S. Appl. No. 11/324,845, mailed Sep. 21, 2009.

* cited by examiner

ENABLING PROXY SERVICES USING REFERRAL MECHANISMS

CROSS-REFERENCE TO RELATED APPLICATIONS

This application: claims priority under 35 U.S.C. §119(e) to U.S. Provisional Patent Application No. 60/503,190, filed on Sep. 15, 2003, entitled "METHOD AND APPARATUS TO ENABLE PROXY SERVICES USING REFERRAL MECHANISM," by Anand Iyengar et al.; is related to U.S. patent application Ser. No. 10/831,376, filed on Apr. 23, 2004, entitled "TRANSPARENT FILE MIGRATION USING NAMESPACE REPLICATION," by Thomas K. Wong et al.; and is related to U.S. patent application Ser. No. 10/831,701, filed on Apr. 23, 2004, entitled "TRANSPARENT FILE REPLICATION USING NAMESPACE REPLICATION," by Thomas K. Wong et al., each of which applications are hereby incorporated by reference in their entirety.

BACKGROUND OF THE INVENTION

1. Field of the Invention

This invention relates generally to storage networks and, more specifically, to a network device on a storage network that uses referrals to successively authorize a client on multiple file servers.

2. Description of the Related Art

In a computer network, NAS (Network Attached Storage) file servers connected directly to the network provide an inexpensive and easily configurable solution for a storage network. These NAS file servers are self-sufficient because they contain file systems that allow interoperability with clients running any operating system and communication using open protocols. For example, a Unix-based client can use the NFS (Network File System) protocol by Sun Microsystems, Inc. of Santa Clara, Calif. and a Windows-based client can use CIFS (Common Internet File System) by Microsoft Corp. of Redmond, Wash. to access the same files on a NAS file server. Thus, NAS file servers provide true universal file access.

By contrast, more expensive and powerful SAN (Storage Area Network) file servers use resources connected by Fibre Channel on a back-end, or a dedicated network. A SAN file system is part of the operating system or an application running on the client. But heterogeneous client operating systems may require additional copies of each file to be stored on the storage network to ensure compatibility on the SAN file server. Additionally, communication between clients and file servers on a SAN use proprietary protocols and thus are typically provided by a common vendor. As a result, NAS file servers are preferred when price and ease of use are major considerations. However, the benefits of NAS storage networks over SAN storage networks also have drawbacks.

One drawback with NAS file servers is that there is no centralized control. Accordingly, each client must maintain communication channels between each of the NFS file servers separately. When NAS file servers are either added or removed from the storage network, each client must mount or unmount directories for the associated storage resources as appropriate. This is particularly inefficient when there are changes in hardware, but not in the particular files available on the network, such as when a failing NAS file server is swapped out for an identically configured back-up NAS file server.

However, when a proxy server is introduced between clients and NAS file servers, a number of issues arise. The proxy must form connections with multiple file servers, which requires authentication with each of them on behalf of the user on the client. This is problematic because the proxy must have a password, or hashing thereof, to respond to server challenges. The proxy could connect to one of the NAS file servers, and pass through an authentication challenge from the file server, and pass back a response from the client, but this technique only allows the client to connect to that one file server. In order to connect with additional file servers, the proxy would be required to responds to the file server challenges itself. A proxy serving numerous users would thus be required to store all of those passwords, thereby introducing an additional security risk. Furthermore, the proxy server would have to maintain password updates.

Additionally, the proxy server introduces protocol dialect issues. For each connection with a file server, the proxy server negotiates a single protocol dialect. The proxy server separately negotiates a single protocol dialect with each client, which can be different from that of the file server connection. As a result, these clients would not be able to communicate with the file server.

Therefore, what is needed is a robust network device to authorize a client with several file servers to provide secure transparency of decentralized file servers such as NAS file servers. Furthermore, the network device should enable communications between a client and a file server using different protocol dialects.

BRIEF SUMMARY OF THE INVENTION

The present invention meets these needs by authenticating a client on multiple file servers for proxy services. In one embodiment, a NAS (Network Attached Storage) switch in the data path of a client and file servers on the storage network, enables proxy services by successively authenticating the client on the file servers using referrals. Advantageously, the client benefits from centralized services on a decentralized network while maintaining security standards.

An embodiment of a system configured according to the present invention comprises the NAS switch in communication with the client on a front-end of a storage network, and the file servers on a back-end. The NAS switch further comprises a connection manager to establish connections to the client and the file servers, a referral manager to redirect the client for successive authentications, and a transaction manager to perform data transfers with the file servers on behalf of the client. In one embodiment, the system components support DFS (Distributed File System). In another embodiment, the system components communicate using a protocol dialect that supports referral mechanisms such as NFSv4 (Network File Server version 4) or CIFS (Common Internet File System).

In another embodiment, the referral manager sends an error message to the client in response to a client transaction request. The error message triggers a client supporting DFS to respond with a referral request. The referral manager uses the referral request to redirect the client to one or more file servers which its user has yet to authenticate. To authenticate, the referral manager can pass through a challenge and response algorithm, a password, and other authentication information.

In one embodiment, the connection manager uses a proxy server to for authentication through short-term connections. This is because some clients will only authenticate once to a single IP address, so a different IP address must be presented to the client for further authentication. Once authentication is complete, the referral mechanism can associate the file server with the virtual server, and refer the client to the virtual server. The virtual server also serves as a single point of communication for both the client and the storage network. In another embodiment, the referral manager uses a cookie having a sharename to uniquely identify the client when redirecting from the proxy server to the virtual server.

In yet another embodiment, the transaction manager can limit communication protocol dialects to those commonly available between clients and file servers. For example, if a client or a file server supports protocol dialect A, but not B, then the transaction manager limits set-ups to A. The transaction manager can intercept negotiation messages and alter the choices according to those commonly available. In another embodiment, the transaction manager performs a protocol dialect translation service. Translations are necessary, for example, when the connection manager negotiates one protocol dialect with the client, and a different protocol dialect with the file server.

DETAILED DESCRIPTIONS OF THE INVENTION

The present invention provides authentication of a client on multiple file servers for proxy services. A NAS (Network Attached Storage) switch in the data path of a client and NAS file servers on the storage network, successively authenticates a client on file servers using referrals. Some embodiments of a system are described with respect to FIGS. 1-2, and some embodiments of a method operating therein are described with respect to FIGS. 3-7.

The processes, features, or functions of the present invention can be implemented by program instructions that execute in an appropriate computing device. Example computing devices include enterprise servers, application servers, workstations, personal computers, network computers, network appliances, personal digital assistants, game consoles, televisions, set-top boxes, premises automation equipment, point-of-sale terminals, automobiles, and personal communications devices. The program instructions can be distributed on a computer readable medium, storage volume, or the Internet. Program instructions can be in any appropriate form, such as source code, object code, or scripts.

Figure 1:
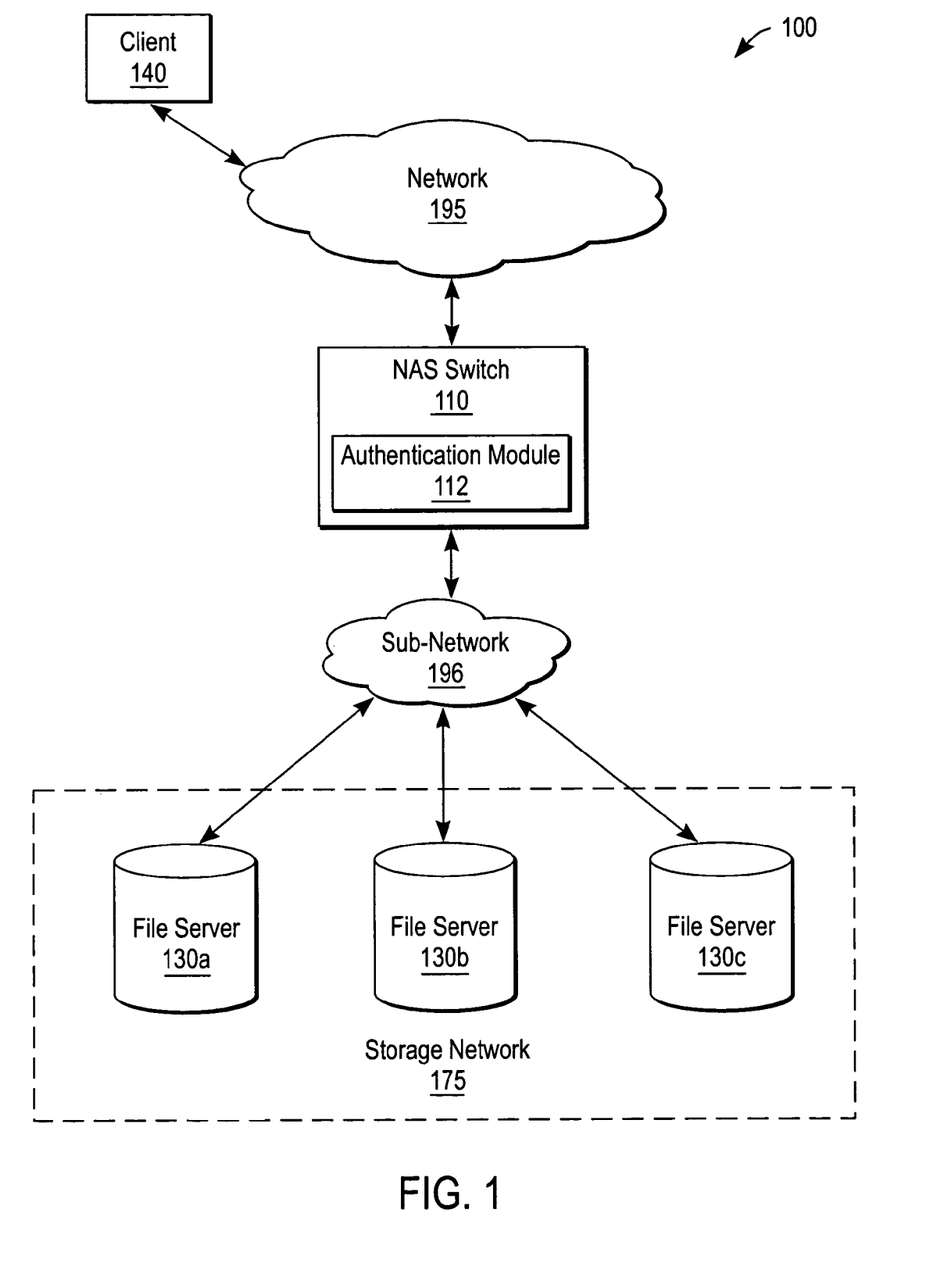
FIG. 1 is a high-level block diagram illustrating a storage network system according to one embodiment of the present invention.

FIG. 1 is a high-level block diagram illustrating a storage network system 100 according to one embodiment of the present invention. The system 100 comprises a NAS switch 110 coupled to a client 140 and a storage network 175 through a network 195. The storage network 175 further comprises file servers 130a-c, each also coupled in communication with the NAS switch 110 through the sub-network 196. Note that there can be various configurations of the system 100, such as embodiments including additional clients 140, additional file servers 130, and additional NAS switches 110.

The system 100 components are implemented in, for example, a personal computer with an x86-type processor executing an operating system and/or an application program, a workstation, a specialized NAS device with an optimized operating system and/or application program, a modified server blade, and the like. In one embodiment, the storage network 175 comprises a NAS storage network, using protocols such as NFSv4 (Network File System version 4) and CIFS (Common Internet File System) that preferably support referral mechanisms. In another embodiment, the storage network 175 comprises a combination of NAS, SAN (Storage Area Network), and other types of storage networks. In yet another embodiment the storage network 175 comprises a decentralized or proprietary storage network other than NAS.

The NAS switch 110 comprises an authentication module 112 to obtain permission for the NAS switch 110 to perform transactions on behalf of the client 140. In one embodiment, the authentication module 112 does so by successively referring the client 140 to present authentication credentials to different file servers 130; effectively tricking the client 140 to log-in with each file server. The authentication module 112 establishes connections with the client 140 and one of the file servers 130. When the client 140 sends a transaction request to a file server, the authentication module 112 returns an error message indicating the object is not available. The authentication module 112 then uses a subsequent referral request by the client 140 seeking to locate the object to redirect the client 140 to a different file server 130. The client 140 provides authentication information to the other file server in order to again request the object. This process repeats until the NAS switch 110 has logged in to all necessary file servers 130.

In one embodiment, the NAS switch 110 provides proxy services such as continuous transparency to the client 140 with respect to object management. Specifically, the NAS switch 110 can off-load tasks related to physical configurations, object management, object migration, object replication, efficient storage and/or other services on the storage network 175. Preferably, the NAS switch 110 emulates file server processes to the client 140 and emulates client processes to the file servers 130. Accordingly, the client 140 is unaware of the NAS switch 110 since the NAS switch 110 is able to redirect NAS requests intended for the file servers 130 to appropriate locations on the storage network 175. Thus, the client 140 submits object requests, such as file writes and directory reads, directly to the NAS switch 110. Likewise, the file servers 130 are unaware of the NAS switch 110 since the NAS switch 110 is able to resubmit requests, associated with NAS file handles, as if they originated from the client 140. To do so, the NAS switch 110 can use mapping, translating, bridging, packet forwarding, other network interface functionality, and other control processes to perform file handle switching, thereby relieving the client 140 of the need to track changes in a file's physical location.

To provide transparency, the NAS switch 110 can present a unified namespace to the client module 112. The NAS switch 110 creates the unified namespace from exported file system directories sent by the file servers 130. The exported file directories contain NAS file handles indicating object locations on the file server. To create compatibility with the client 140, the NAS switch 110 maps the file system directories to an internal switch file system containing switch file handles which it sends to the client 140. To request an object, the client 140 traverses an exported switch file system and selects a switch file handle which it sends to the NAS switch 110 along with a requested operation.

In one embodiment, the NAS switch 110 also tracks reconfigurations resulting from migration, replication and other object relocation processes (e.g. adding or removing file server capacity) with a nested system of tables, or information otherwise linked to the switch file systems. The switch file handles are static as they are persistent through the relocation processes, but the associated NAS file handles can be dynamic as they are selected depending upon an object's current location. To track various copies of an object, the file server module 114 maintains a directory server table, a file location cache, file handle migration table, and/or a file handle replication table corresponding to each file system that maps NAS file handles of migrated and replicated objects to locations on the storage network 175.

In general, NAS file handles uniquely identify objects, such as a directory file server, on the file servers 130 as long as that object exists. NAS file handles are file server specific, and are valid only to the file servers 130 that issued the file handles. The process of obtaining a file handle from a file name is called a look-up. The NAS file handle may be formatted according to protocols such as NFS or CIFS. By contrast, a switch file handle identifies a directory or file object independent of location, making it persistent through file replications, migrations, and other data transfers. The switch file can be a NAS file handle modified to refer to the NAS switch file system. An original NAS file handle refers to an initial object location.

Object transaction requests handled by the NAS switch 110 include, for example, directory and/or file reads, writes, creation, deletion, moving, and copying. As used herein, various terms are used synonymously to refer to a location of an object prior to replication (e.g., "primary"; "source"; "original"; and "first") and various terms are used to refer to a location of the same object after migration (e.g., "replica"; "destination"; "substitute"; and "second"). Further embodiments of the NAS switch 110 and methods operating therein are described below.

The client 140 authenticates on the file servers 130 through the NAS switch 110 in order to access objects on the storage network 175. The client 140 can authenticate using a challenge and response algorithm. In one embodiment, the client 140 supports Kerberos authentication for further security against man-in-the-middle attacks. The client 140 can track down moved objects by requesting a referral from the file server 130 whenever the client receives an error message in response to requesting an object that has been moved elsewhere on the storage network 175. In one embodiment, the client 140 supports Distributed File System (DFS) which allows it to view the unified namespace provided by the NAS switch 110. The client 140 refers to objects in the unified namespace with switch file handles submitted to the NAS switch 110 with transaction requests. In one embodiment, the client 140 provides access to a storage network 175 other than a NAS storage network.

The network 195 facilitates data transfers between connected hosts (e.g., 110, 120, 130, 140). The connections to the network 195 may be wired and/or wireless, packet and/or circuit switched, and use network protocols such as TCP/IP (Transmission Control Protocol/Internet Protocol), IEEE (Institute of Electrical and Electronics Engineers) 802.11, IEEE 802.3 (i.e., Ethernet), ATM (Asynchronous Transfer Mode), or the like. The network 195 comprises, for example, a LAN (Local Area Network), WAN (Wide Area Network), the Internet, and the like. In one embodiment, the NAS switch 110 acts as a gateway between the client 140, connected to the Internet, and the file servers 130, connected to a LAN.

Figure 2:
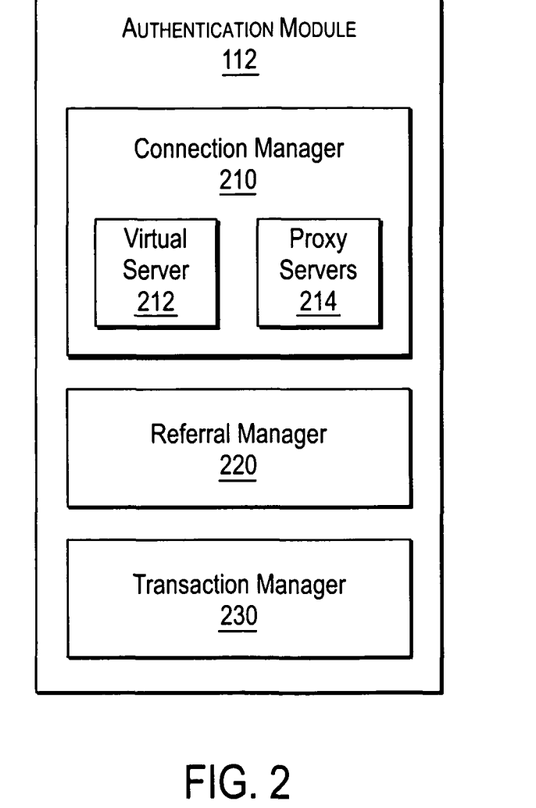
FIG. 2 is a block diagram illustrating an authentication module according to one embodiment of the present invention.

FIG. 2 is a block diagram illustrating the authentication module 112 according to one embodiment of the present invention. The authentication module 112 comprises a connection manager 210, a referral manager 220, and a transaction manager 230. Generally, the connection manager 210 sets up communications channels between the client 140 and the file servers 130 for the transaction manager 230 by using referrals from the referral manager 220. Methods operating within the authentication module 112 are discussed below in greater detail with respect to FIG. 3. Note that rather than being strict structural separations, "modules" and "managers" are merely exemplary groupings of functionality corresponding to one or many structures.

More specifically, the connection manager 210 of the present embodiment comprises a virtual server 212 and proxy servers 214. The virtual server 212 manages long-term communication channels enabled by short-term communications channels of the proxy servers 214. In one embodiment, the proxy servers are uniquely identifiable by the client 140 such as by having separate IP addresses, port numbers, or any other identifiers. Accordingly, each proxy server 214 can correspond to a file server 130 so that the client 140 interacts with the proxy server 214 in the same manner as it would directly interact with the file server 130. Once a connection is established the proxy server 214 associates the connection with the virtual server 212 so that the virtual server 212 becomes a single point of communications. In one embodiment, the proxy server 214 communication channels are torn down shortly thereafter. In another embodiment, the connection manager comprises physical communication accessories such as an Ethernet input/output port, communications software for managing logical ports, and the like.

The referral manager 220 redirects the client 140 from one proxy server 214 to another for authentication. When the referral manager 220 detects a client without authentication on one or more file servers 130, it can generate error messages in response to a transaction request. Furthermore, in response to referral requests by the client 140, the referral manager 220 can redirect the client 140 to the one or more file servers 130.

The transaction manager 230 performs transactions with the file servers 130 on behalf of the client 140. To do so, the transaction manager 230 performs file switching between client file handles to the unified namespace and NAS file handles used by the file servers 130. In one embodiment the transaction manager 230 translates between protocol dialects when the client connections and server connections have negotiated different protocol dialects. In another embodiment, the transaction manager 230 provides services that are not initiated by the client 140 such as file migration, file replication, and directory services.

Figure 3:
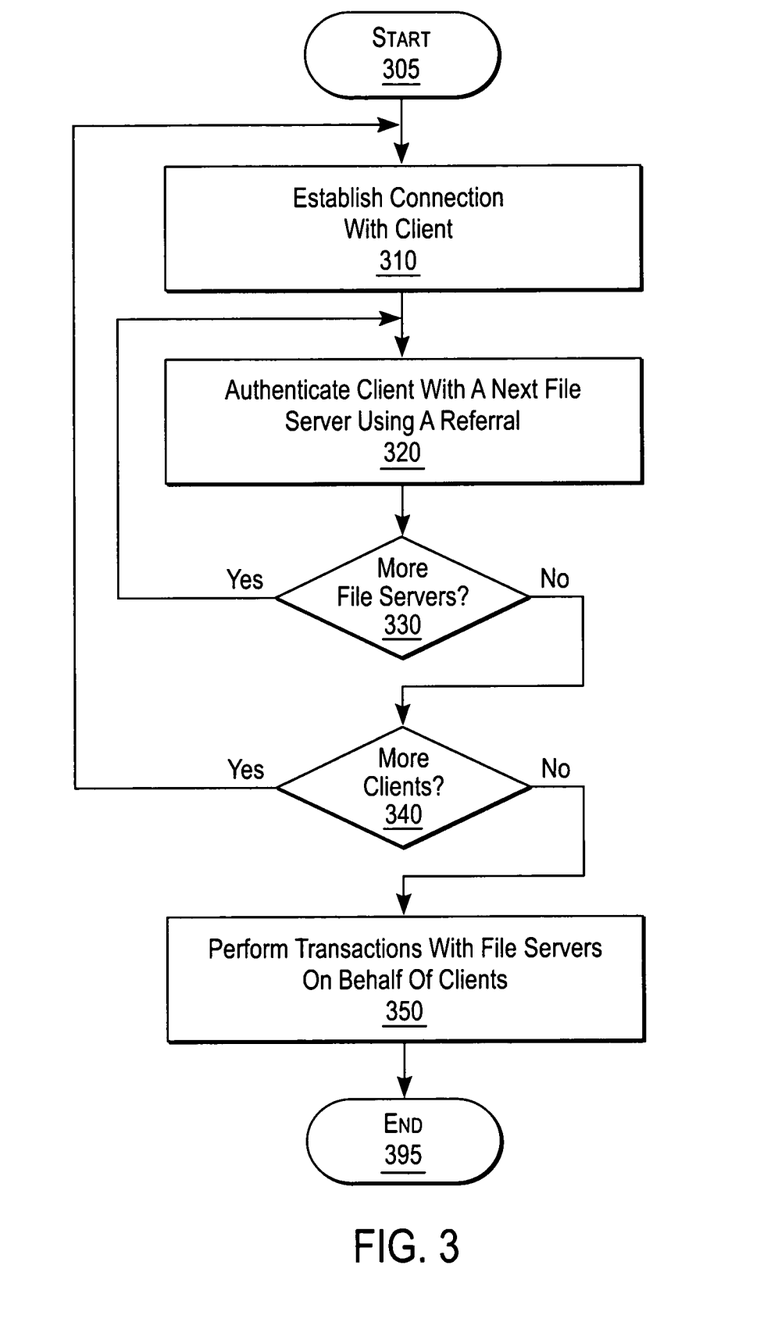
FIG. 3 is a high-level flow chart illustrating a method of authenticating clients with file servers for proxy services according to one embodiment of the present invention.

FIG. 3 is a high-level flow chart illustrating a method 300 of authenticating clients 140 with file servers 130 for proxy services according to one embodiment of the present invention. Note that the embodiments of FIGS. 3-7 are merely exemplary and can vary between protocol different protocols. An example of the method 300 is set forth in a sequence diagram of FIG. 7.

Figure 4:
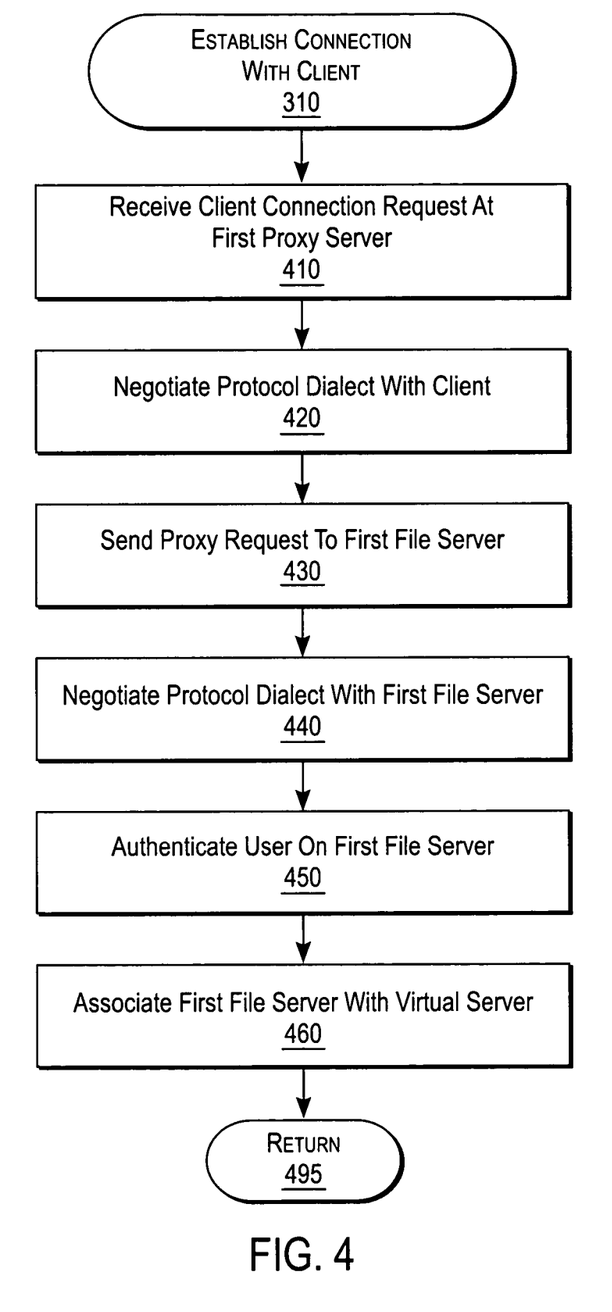
FIG. 4 is a flow chart illustrating a method of establishing a connection with a client according to one embodiment of the present invention.

In one embodiment, the connection manager 210 first establishes 310 a connection with a client 140 as discussed in greater detail with respect to FIG. 4. Either the client 140 or the NAS switch 110 can initiate the connection. The referral module 220 authenticates 320 the client with a file server 130 using a referral as discussed in greater detail with respect to FIG. 5. Note that the three file servers 130 of the storage network 175 are merely exemplary as there may be only one or many more than three file servers 130. The referral module 220 continues authenticating 330 until the client 140 has logged in to all file servers 130. In one embodiment, the authentication module 112 authenticates multiple clients 140 and/or users 340.

Figure 6:
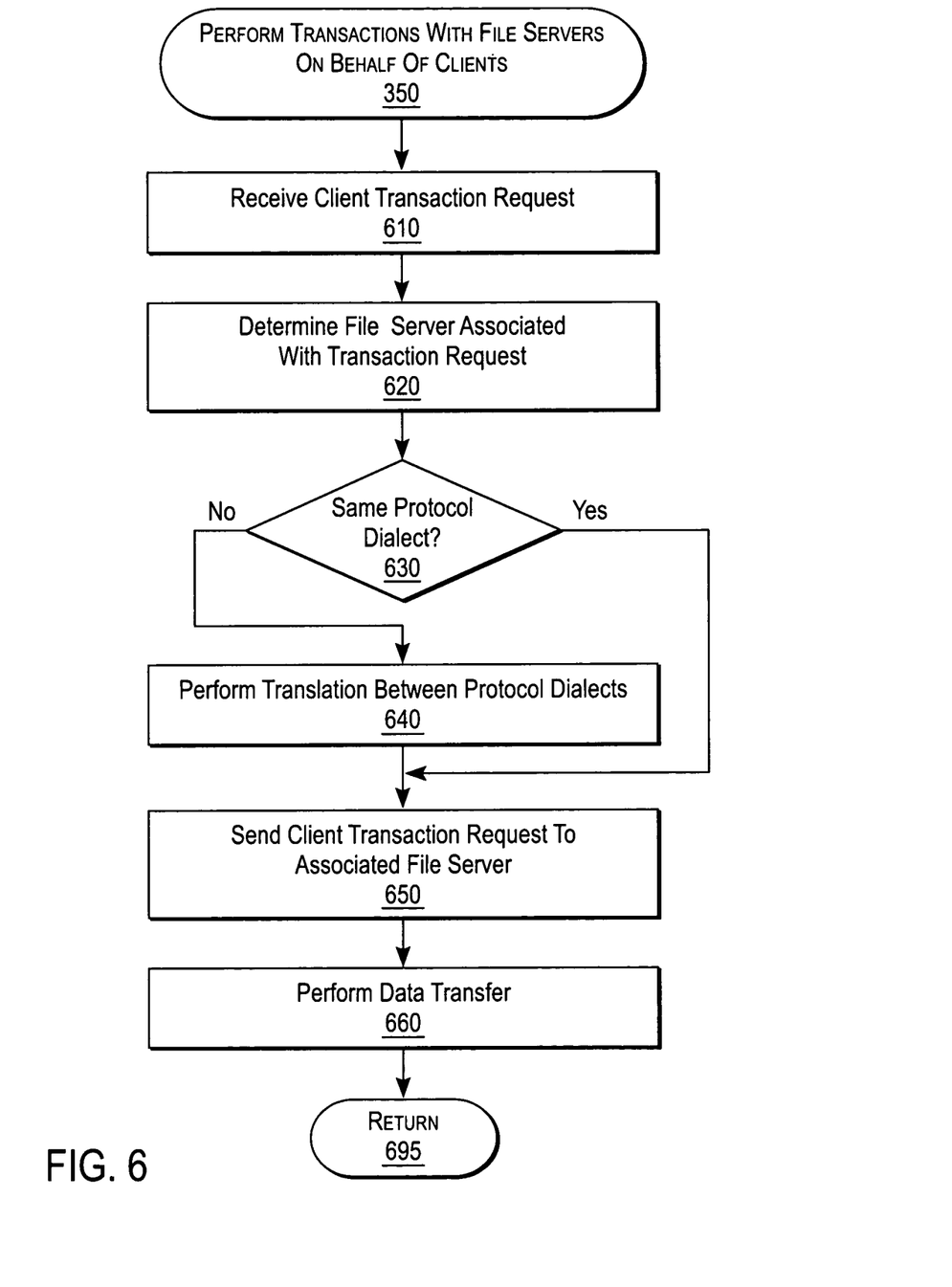
FIG. 6 is an exemplary flow chart illustrating a method of performing transactions with file servers on behalf of clients according to one embodiment of the present invention.

Once the communication channels have been properly established, the transaction module 230 performs 350 transactions with file servers 130 on behalf of clients 140 as discussed in greater detail with respect to FIG. 6. Additional embodiments of performing 350 transactions are described in U.S. patent application Ser. No. 10/831,376 and U.S. patent application Ser. No. 10/831,701.

FIG. 4 is a flow chart illustrating the method 310 of establishing a connection with the client 140 according to one embodiment of the present invention. A first proxy server 214 receives 410 a connection request from the client 140. To enable communications, the first proxy server 214 negotiates 420 a protocol dialect with the client 140. In addition, the first proxy server 214 sends 430 a connection request to the first file server 130. The first proxy server 214 also negotiates 440 a protocol dialect with the first file server 130. In one embodiment, the protocol dialects differ. For example, the protocol dialects can differ due to lack of capability by either the client 140 or the first file server 130. In another example, the first file server 130 is already be connected to the NAS switch 110 using a different protocol dialect.

The proxy server 214 authenticates 450 the user on the first file server 130. In one embodiment, the file server 130 presents a challenge to the proxy server 214, which the proxy server 214 forwards to the client 140. The client 140 a response, such as a hashed bit string, back to the file server 130 through the proxy server 214. In another embodiment, the client 140 is required to send a password or other authentication information. As a result, the proxy server 214 successfully establishes a direct communication channel with the first file server 130 without storing the user's authentication information.

Since proxy server 214 connections may only be temporary, the proxy server 214 associates the first file server 214 with a long-term connection to the virtual server 212. In one embodiment, the proxy server 214 tears down the client connection after this transfer.

Figure 5:
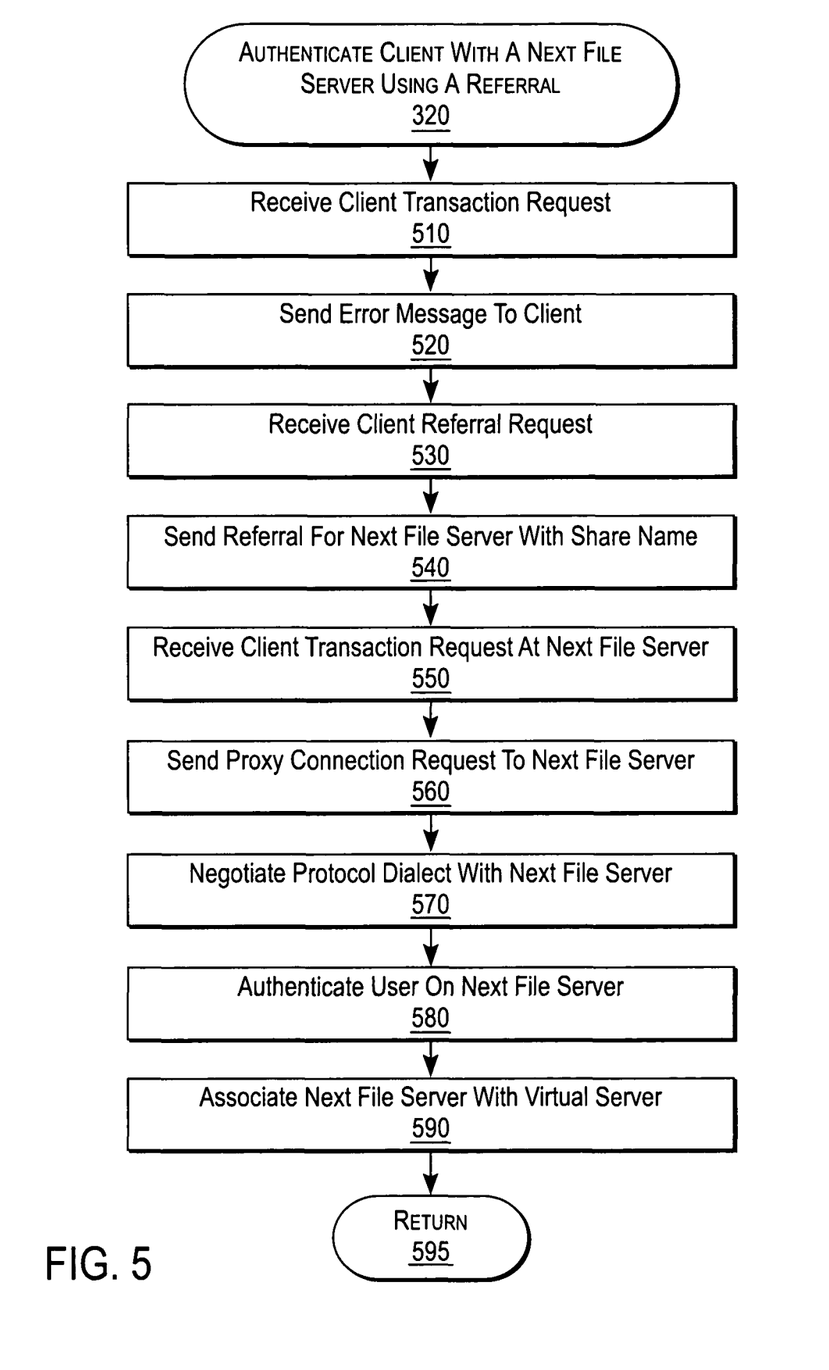
FIG. 5 is a flow chart illustrating a method of authenticating a client with a file server using a referral according to one embodiment of the present invention.

FIG. 5 is a flow chart illustrating the method 320 of authenticating the client 140 with a next file server 130 using a referral according to one embodiment of the present invention. The first proxy server 214 receives 510 a client 140 transaction request. For example, the client 140 can send an OPEN ("\some\file.txt") message. In response, the referral manager 220 sends 520 an error message to the client 140 such as a PATH_NOT_COVERED message. The referral manager 220 receives 530 a referral request from the client 140 such as a GET_DFS_REFERRAL ("\some\file.txt") message. In response, the referral manager 220 sends 540 a referral for a next file server 130 or a list of file servers 130. The referral can be a file name from the unified namespace, specific to a file server 130, include an IP address, or any other identifying information. In one embodiment, the referral manager 220 sends a cookie having a sharename to uniquely identify the user and/or client 140.

The next proxy server 214 receives 550 a transaction request from the client 140 based on the referral. The next proxy server 214 and the client 140 negotiate a protocol dialect since the client 140 treats connection as separate from the virtual server 212 connection. Additionally, the user needs to authenticate on the next file server 130, so the next proxy server 214 sends 560 a connection request. If not already connected, the next proxy server 214 negotiates 570 a protocol dialect with the next file server 570. In one embodiment, the protocol dialect differs from either the client 140 protocol dialect, or the previous file server 130 protocol dialect. The next proxy server 214 authenticates 580 the user on the next file server 130. Again, the next proxy server 214 associates the next file server 214 with the virtual server 212 for a long-term connection.

FIG. 6 is a flow chart illustrating the method 350 of performing transactions with file servers 130 on behalf of clients 140 according to one embodiment of the present invention. The transaction manager 230 receives 610 a transaction request from the client 140 using, for example, a switch file handle from the unified namespace. The transaction manager 230 determines 620 which file server 130 is associated with the transaction request. To do so, the transaction manager 230 matches the switch file handle to a NAS file handle exported by the file servers 130. In one embodiment, the transaction manager 230 keeps abreast of changes on the storage network 175 such as file migrations and file replications, and makes corresponding updates to NAS file handles. For example, for a migrated file, the transaction manager 230 will use a NAS file handle pointing to the file's new location.

In the present embodiment, if the client 140 and file server 130 communicate with the virtual server 212 using different protocol dialects 630, the transaction manager 230 can perform 640 a translation service. Once the transaction request has been processed, the virtual server 212 sends 650 the transaction request to the file server 130. For data transfers such as a read operation, the transaction manager 230 performs 660 a data transfer by forwarding data received from the file server 130 to the requesting client 140.

Figure 7A:
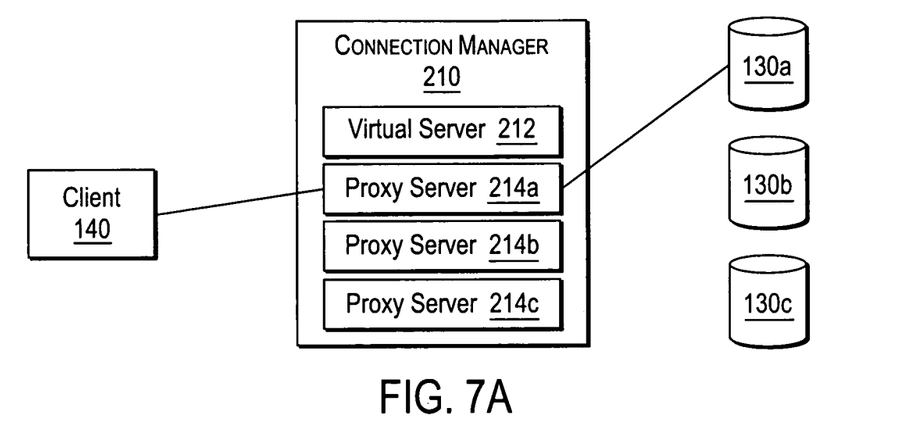
FIGS. 7A-F is a sequence diagram illustrating a method of authenticating a client with file servers for proxy services according to one embodiment of the present invention.
Figure 7B:
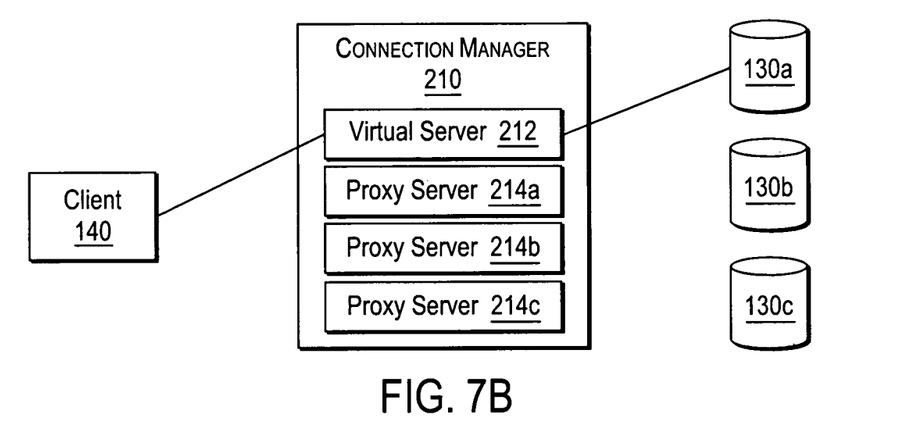

FIGS. 7A-F are exemplary sequence diagrams illustrating a method 700 of authenticating the client 140 with file servers 130 for proxy services according to one embodiment of the present invention. In FIG. 7A, the client 140 connects to the proxy server 214a, which initiates a connection with the file server 130a. The proxy server 214a can negotiate separate protocol dialects for the client 140 connection and the file server 130a connection. The proxy server 214a can also pass a challenge and response algorithm, log-in credentials, or other authentication information. In FIG. 7B, once authentication has been successfully completed, the connection manager 210 refers the client to the virtual server 212, and associates the file server 130a with the virtual server 212. The proxy server 214a can tear down the client 140 connection.

Figure 7C:
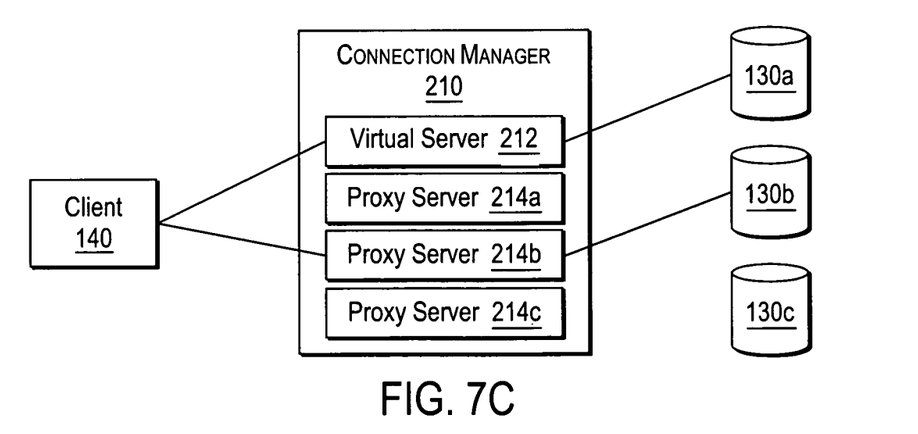
Figure 7D:
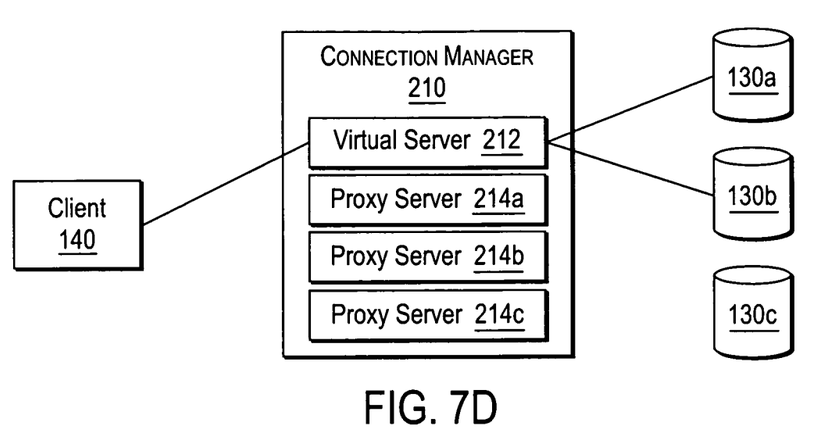
Figure 7E:
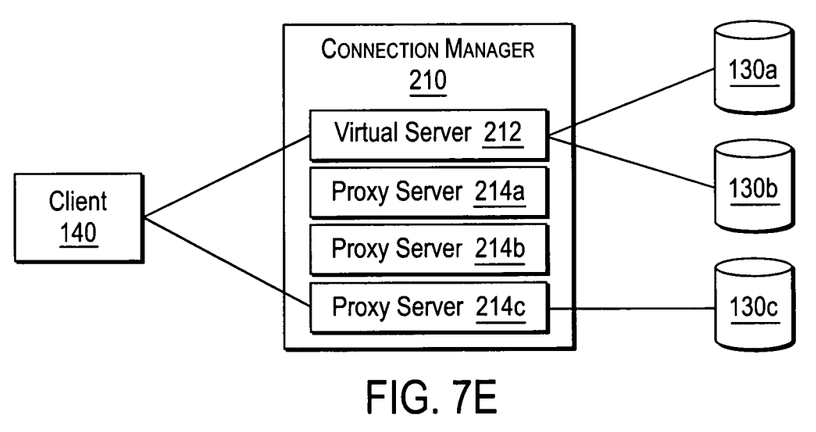
Figure 7F:
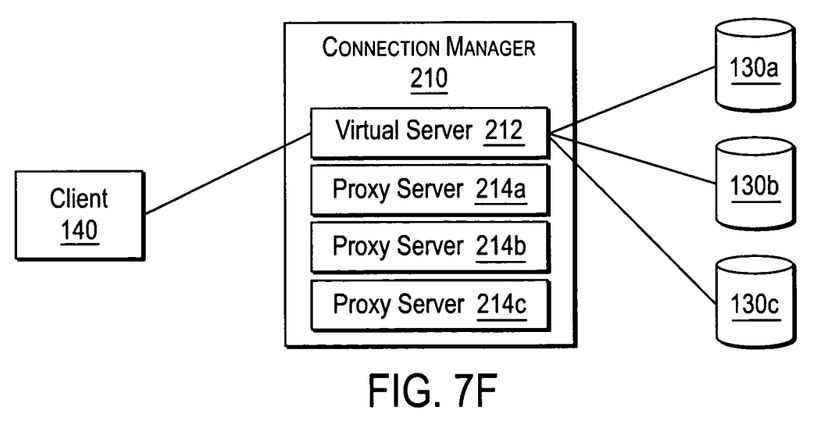

In FIG. 7C, the connection manager 210 next refers the client to the proxy server 214b in order to authenticate with file server 130b. In FIG. 7D, the connection manager 210 associates the authenticated file server 130b with the virtual server 212 and tear down the client 140 connection. This process is repeated in FIGS. 7E-F in authenticating the client 140 with the file server 130c.

The above description is included to illustrate the operation of the preferred embodiments and is not meant to limit the scope of the invention. The scope of the invention is instead be limited only by the following claims.

We claim:

1. A method for authenticating a client on a plurality of file servers in connection with providing proxy services to the client, comprising:
   establishing, at a network device, a connection between the client and a first file server of the plurality of file servers;
   receiving, at the network device, a transaction request from the client to access an object on the plurality of file servers;

in response to the received transaction request and in order to provide proxy services to the client, authenticating, at the network device, the client on the other file servers of the plurality of file servers by successively obtaining a referral request from the client for each of the other file servers, wherein the successively obtained referral requests are used to authenticate the client on each of the other file servers of the plurality of file servers in connection with providing proxy services to the client, the authenticating comprising for each file server:
   the network device sending a request declined message to the client indicating the requested object is not available;
   the network device receiving a referral request from the client;
   the network device responding to the received referral request by sending the client a referral, wherein the referral refers the client to the each file server;
   the network device receiving a reformulated transaction request from the client in response to the referral, wherein the reformulated transaction request comprises authentication information for the client; and
   the network device forwarding the reformulated transaction request to the each file server, wherein the each file server uses the authentication information to authenticate the client on the each file server; and
after authenticating the client on the plurality of file servers, performing transactions at the network device to access the object or other objects on the plurality of file servers on behalf of the client.

2. The method of claim 1, wherein establishing the connection between the client and the first file server comprises:
negotiating a first protocol dialect with the client.

3. The method of claim 2, further comprising:
negotiating a second protocol dialect with one or more file servers from the plurality of file servers, the second protocol dialect differing from the first protocol dialect, wherein the performing transactions comprises translating a transaction request from the first protocol dialect to the second protocol dialect.

4. The method of claim 3, further comprising:
negotiating a third protocol dialect with one or more file servers from the plurality of file servers, the third protocol dialect differing from the second protocol dialect.

5. The method of claim 3, wherein the authenticating the client on the other file servers of the plurality of file servers comprises:
negotiating a third protocol dialect with a second file server.

6. The method of claim 2, wherein the first protocol dialect comprises NFS (Network File System) or CIFS (Common Internet File System).

7. The method of claim 1, wherein the message sent to the client in response to the transaction request is an error message.

8. The method of claim 1, wherein the authenticating the client on the other file servers of the plurality of file servers comprises:
referring the client to a file server from among the other file servers using the referral request received from the client.

9. The method of claim 1, wherein the authenticating the client on the other file servers of the plurality of file servers comprises:
receiving authentication information for one or more file servers; and
establishing a connection to the one or more file servers using the authentication information.

10. The method of claim 9, wherein the authentication information comprises Kerberos authentication information.

11. The method of claim 1, wherein the authenticating the client on the other file servers of the plurality of file servers comprises:
associating the plurality of file servers with a virtual server; and
referring the client to the virtual server using a sharename that uniquely identifies the client.

12. The method of claim 1, wherein the authenticating the client on the other file servers of the plurality of file servers comprises:
authenticating the client on the other file servers using a plurality of proxy servers, each at a separate network address.

13. The method of claim 12, further comprising:
associating the plurality of file servers with a virtual server at a network address differing from the proxy server network addresses.

14. The method of claim 1, wherein the client supports DFS (Distributed File System).

15. The method of claim 1, wherein the performing the transactions comprises:
performing one or more of create file, delete file, move file, copy file, read file, or write file.

16. A NAS (Network Attached Storage) switch to authenticate a client on a plurality of file servers in connection with providing proxy services to the client, comprising:
an interface connecting the switch to other devices;
memory; and
a processor or processors, the processor or processors configured to perform the functions of:
a connection manager to establish a connection between the client and a first file server of the plurality of file servers;
a referral manager to authenticate the client on the other file servers of the plurality of file servers, in response to receiving a transaction request from the client to access an object on the plurality of file servers, by successively obtaining a referral request from the client for each of the other file servers, wherein the successively obtained referral requests are used to authenticate the client on each of the other file servers of the plurality of file servers in connection with providing proxy services to the client, the authenticating comprising for each file server:
   the NAS switch sending a request declined message to the client indicating that the requested object is not available;
   the NAS switch receiving a referral request from the client;
   the NAS switch responding to the received referral request by sending the client a referral, wherein the referral refers the client to the each file server;
   the NAS switch receiving a reformulated transaction request from the client in response to the referral, wherein the reformulated transaction request comprises authentication information for the client; and
   the NAS switch forwarding the reformulated transaction request to the each file server, wherein the each file server uses the authentication information to authenticate the client on the each file server; and a transaction manager to perform transactions to access the object or other objects on the plurality of file servers on behalf of the client after authenticating the client on the plurality of file servers.

17. The NAS switch of claim 16, wherein the connection manager is further configured to negotiate a first protocol dialect with the client.

18. The NAS switch of claim 17, wherein the connection manager is further configured to negotiate a second protocol dialect with one or more file servers from the plurality of file servers, the second protocol dialect differing from the first protocol dialect, and the transaction manager translates a transaction request from the first protocol dialect to the second protocol dialect.

19. The NAS switch of claim 18, wherein the connection manager is further configured to negotiate a third protocol dialect with one or more file servers from the plurality of file servers, the third protocol dialect differing from the second protocol dialect.

20. The NAS switch of claim 18, wherein the referral manager is further configured to negotiate a third protocol dialect with a second file server.

21. The NAS switch of claim 17, wherein the first protocol dialect comprises NFS (Network File System) or CIFS (Common Internet File System).

22. The NAS switch of claim 16, wherein the referral manager, in response to receiving the transaction request, is further configured to send an error message to the client.

23. The NAS switch of claim 16, wherein the referral manager, in response to receiving the referral request from the client, is further configured to refer the client to a file server from among the other file servers.

24. The NAS switch of claim 16, wherein the referral manager is further configured to receive authentication information for one or more file servers, and establish a connection to the at least one file server using the authentication information.

25. The NAS switch of claim 24, wherein the authenticating information comprises Kerberos authentication information.

26. The NAS switch of claim 16, wherein the referral manager is further configured to associate the plurality of file servers with a virtual server, and refer the client to the virtual server using a sharename that uniquely identifies the client.

27. The NAS switch of claim 16, wherein the authenticating the client on the other file servers of the plurality of file servers comprises:
authenticating the client on the other file servers using a plurality of proxy servers, each at a separate network address.

28. The NAS switch of claim 27, wherein the transaction manager is further configured to associate the plurality of file servers with a virtual server at a network address differing from the proxy server network addresses.

29. The NAS switch of claim 16, wherein the client supports DFS (Distributed File System).

30. The NAS switch of claim 16, wherein the performing the transactions comprises:
performing one or more of create file, delete file, move file, copy file, read file, or write file.

31. A computer program product, comprising a non-transitory computer readable medium having computer program instructions for a method for authenticating a client on a plurality of file servers in connection with providing proxy services to the client, comprising:
establishing, at a network device, a connection between the client and a first file server of the plurality of file servers;

receiving, at the network device, a transaction request from the client to access an object on the plurality of file servers;
in response to the received transaction request and in order to provide proxy services to the client, authenticating, at the network device, the client on the other file servers of the plurality of file servers by successively obtaining a referral request from the client for each of the other file servers, wherein the successively obtained referral requests are used to authenticate the client on each of the other file servers of the plurality of file servers in connection with providing proxy services to the client, the authenticating comprising for each file server:
the network device sending a request declined message to the client indicating the requested object is not available;
the network device receiving a referral request from the client;
the network device responding to the received referral request by sending the client a referral, wherein the referral refers the client to the each file server;
the network device receiving a reformulated transaction request from the client in response to the referral, wherein the reformulated transaction request comprises authentication information for the client; and
the network device forwarding the reformulated transaction request to the each file server, wherein the each file server uses the authentication information to authenticate the client on the each file server; and
after authenticating the client on the plurality of file servers, performing transactions at the network device to access the object or other objects on the plurality of file servers on behalf of the client.

32. The computer program product of claim 31, wherein establishing the connection between the client and the first file server comprises:
negotiating a first protocol dialect with the client.

33. The computer program product of claim 32, the method further comprising:
negotiating a second protocol dialect with one or more file servers from the plurality of file servers, the second protocol dialect differing from the first protocol dialect, wherein the performing transactions comprises translating a transaction request from the first protocol dialect to the second protocol dialect.

34. The computer program product of claim 33, the method further comprising:
negotiating a third protocol dialect with one or more file servers from the plurality of file servers, the third protocol dialect differing from the second protocol dialect.

35. The computer program product of claim 33, wherein the authenticating the client on the other file servers of the plurality of file servers comprises:
negotiating a third protocol dialect with a second file server.

36. The computer program product of claim 32, wherein the first protocol dialect comprises NFS (Network File System) or CIFS (Common Internet File System).

37. The computer program product of claim 31, wherein the message sent to the client in response to the transaction request is an error message.

38. The computer program product of claim 31, wherein the authenticating the client on the other file servers of the plurality of file servers further comprises:
referring the client to a file server from among the other file servers.

39. The computer program product of claim 31, wherein the authenticating the client on the other file servers of the plurality of file servers comprises:
receiving authentication information for one or more file servers; and
establishing a connection to the at least one file server using the authentication information.

40. The computer program product of claim 39, wherein the authenticating information comprises Kerberos authentication information.

41. The computer program product of claim 31, wherein the authenticating the client on the other file servers of the plurality of file servers comprises:
associating the plurality of file servers with a virtual server; and
referring the client to the virtual server using a sharename that uniquely identifies the client.

42. The computer program product of claim 31, wherein the authenticating the client with the other file servers of the plurality of file servers comprises:
authenticating the client with the other file servers using a plurality of proxy servers, each at a separate network address.

43. The computer program product of claim 42, the method further comprising:
associating the plurality of file servers with a virtual server at a network address differing from the proxy server network address.

44. The computer program product of claim 31, wherein the client supports DFS (Distributed File System).

45. The computer program product of claim 31, wherein the performing the transactions comprises:
performing one or more of create file, delete file, move file, copy file, read file, or write file.

* * * * *